United States Patent
Delaney et al.

(10) Patent No.: US 11,403,257 B2
(45) Date of Patent: Aug. 2, 2022

(54) DETERMINING A RELEVANT FILE SAVE LOCATION

(71) Applicant: LENOVO (Singapore) PTE. LTD., New Tech Park (SG)

(72) Inventors: Mark Patrick Delaney, Raleigh, NC (US); John Carl Mese, Cary, NC (US); Nathan J. Peterson, Oxford, NC (US); Russell Speight VanBlon, Raleigh, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 99 days.

(21) Appl. No.: 16/861,774

(22) Filed: Apr. 29, 2020

(65) Prior Publication Data

US 2021/0342300 A1 Nov. 4, 2021

(51) Int. Cl.
*G06F 16/13* (2019.01)
*G06F 16/16* (2019.01)
*G06F 16/11* (2019.01)
*G06F 16/185* (2019.01)

(52) U.S. Cl.
CPC .......... *G06F 16/137* (2019.01); *G06F 16/122* (2019.01); *G06F 16/168* (2019.01); *G06F 16/185* (2019.01)

(58) Field of Classification Search
CPC .... G06F 21/6218; G06F 16/26; G06F 3/0482; G06F 3/04817; G06F 16/221; G06F 16/24573; G06F 16/248; G06F 16/287; G06F 16/182; G06F 40/117
See application file for complete search history.

(56) References Cited

U.S. PATENT DOCUMENTS

| | | | | |
|---|---|---|---|---|
| 2008/0133706 A1* | 6/2008 | Chavez | ................. | H04L 67/108 709/218 |
| 2008/0195664 A1* | 8/2008 | Maharajh | ........... | H04N 21/6587 |
| 2009/0217302 A1* | 8/2009 | Grechanik | ............ | G06F 11/368 719/320 |
| 2013/0054613 A1* | 2/2013 | Bishop | .................... | G06F 16/93 707/E17.046 |
| 2014/0053099 A1* | 2/2014 | Groten | .................. | G06T 19/006 715/790 |

* cited by examiner

*Primary Examiner* — Angelica Ruiz
(74) *Attorney, Agent, or Firm* — Kunzler Bean & Adamson (57) ABSTRACT

For determining a relevant file save location, a processor acquires metadata for a new file. The processor further assigns content tags for the new file based on file content and the metadata. The processor calculates a location correlation to folders of a file system using a file system database. The processor further presents a ranked display of the folders based on the location correlation on a display. The processor moves the new file to a selected folder.

18 Claims, 10 Drawing Sheets

| Folder Name | Correlation |
|---|---|
| Org Charts | 99% |
| Solutions | 82% |
| Transform 2.0 | 51% |
| Blockchain | 22% |
| Employees | 11% |
| POs | 6% |
| Expenses | 4% |
| Personal | 2% |

| Tag Priority List |
| 341 |
| Tag Policy |
| 343 |
| Thresholds |
| 345 |
| Content Frequency |
| 347 |

DETERMINING A RELEVANT FILE SAVE LOCATION

FIELD

The subject matter disclosed herein relates to file save locations and more particularly relates to determining a relevant file save locations.

BACKGROUND

Downloaded and received files are often saved to a computer.

BRIEF SUMMARY

An apparatus for determining a relevant file save location is disclosed. The apparatus includes a display, a processor, and a memory. The memory stores code that is executable by the processor. The processor acquires metadata for a new file. The processor further assigns content tags for the new file based on file content and the metadata. The processor calculates a location correlation to folders of a file system using a file system database. The processor further presents a ranked display of the folders based on the location correlation on the display. The processor moves the new file to a selected folder. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
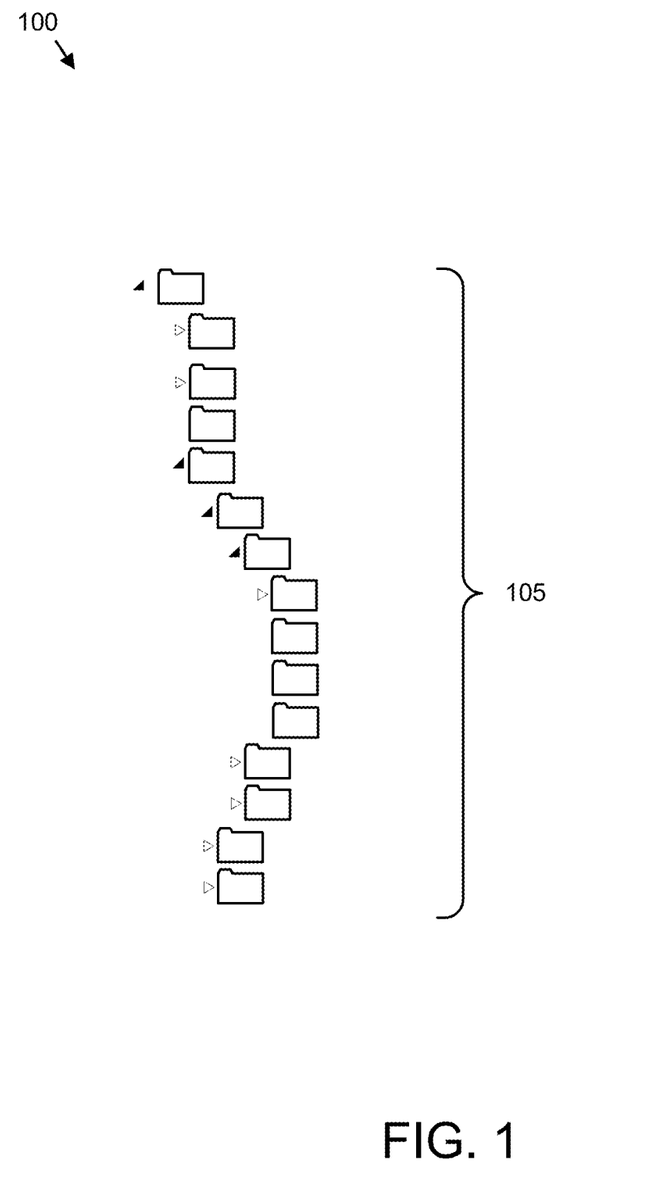
FIG. 1 is a drawing illustrating one embodiment of a file system.

FIG. 1 is a drawing illustrating one embodiment of a file system 100. The file system 100 may be organized as a data structure in a memory of a computer. The file system 100 may include a plurality of folders 105. As used herein, the term folder 105 may include a repository, a grouping, a common path, and the like. The file system 100 may organize files within the folders 105 so the files can be subsequently found and accessed by a user.

Figure 2A:
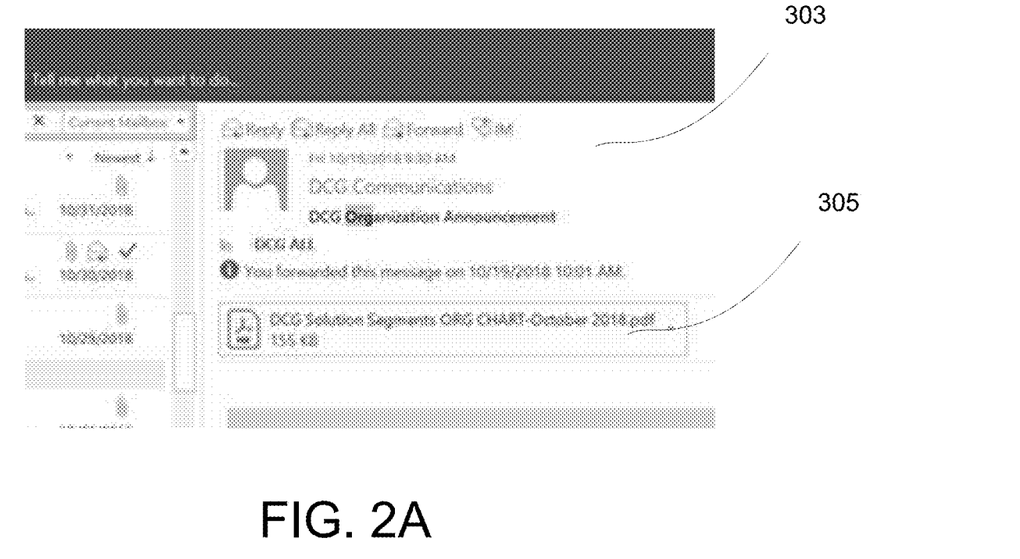
FIG. 2A is an image illustrating one embodiment of receiving a file.

FIG. 2A is an image illustrating one embodiment of receiving a file 305. An email message 303 is shown with an attached file 305. A user may wish to save the file 305 within the file structure 100.

Figure 2B:
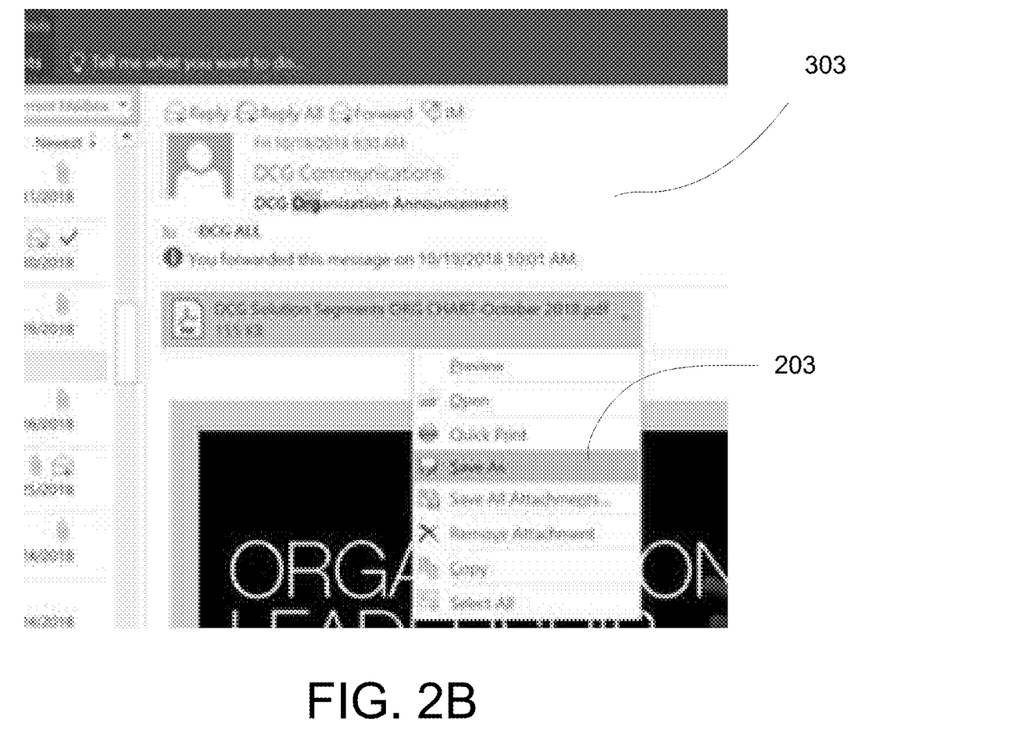
FIG. 2B is an image illustrating one embodiment of saving a file.

FIG. 2B is an image illustrating one embodiment of saving the file 305 of FIG. 2A. In the depicted embodiment, the user opts to save the file 305 using a save as command 203. In the past, the user was given the option of saving the file 305 in multiple different folders 105. The embodiments calculate a location correlation for the new file 305 to folders 105 of the file system 100. In addition, the embodiments present a ranked display of the folders 105 based on the location correlation. The embodiments allow a user to select a folder 105 and move the file 305 to that folder 105. As a result, the destination folder 105 is quickly and efficiently selected and utilized, improving the efficiency of the computer.

Figure 2C:
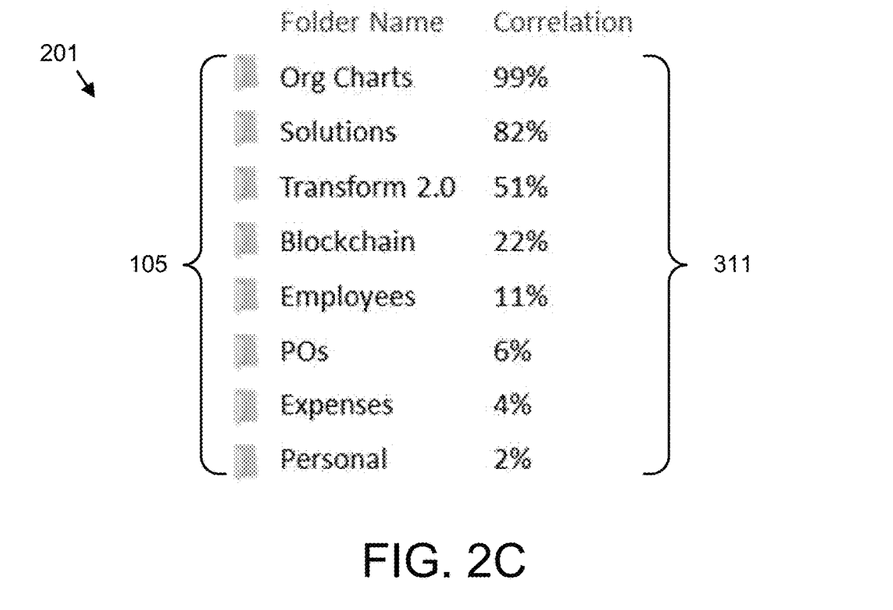
FIG. 2C is an image illustrating one embodiment of a ranked display.

FIG. 2C is an image illustrating one embodiment of the ranked display 201. In the depicted embodiment, the ranked display 201 is a list of folders 105. In addition, a location correlation 311 is associated with each folder 105. The ranked display 201 may also be organized as a plurality of tiles, with each tile representing a folder 105. In addition, each tile may display the location correlation 311. In a certain embodiment, the ranked display 201 may be organized as a heat map, with representations of the folders 105 being color coded to represent the location correlation 311.

Figure 2D:
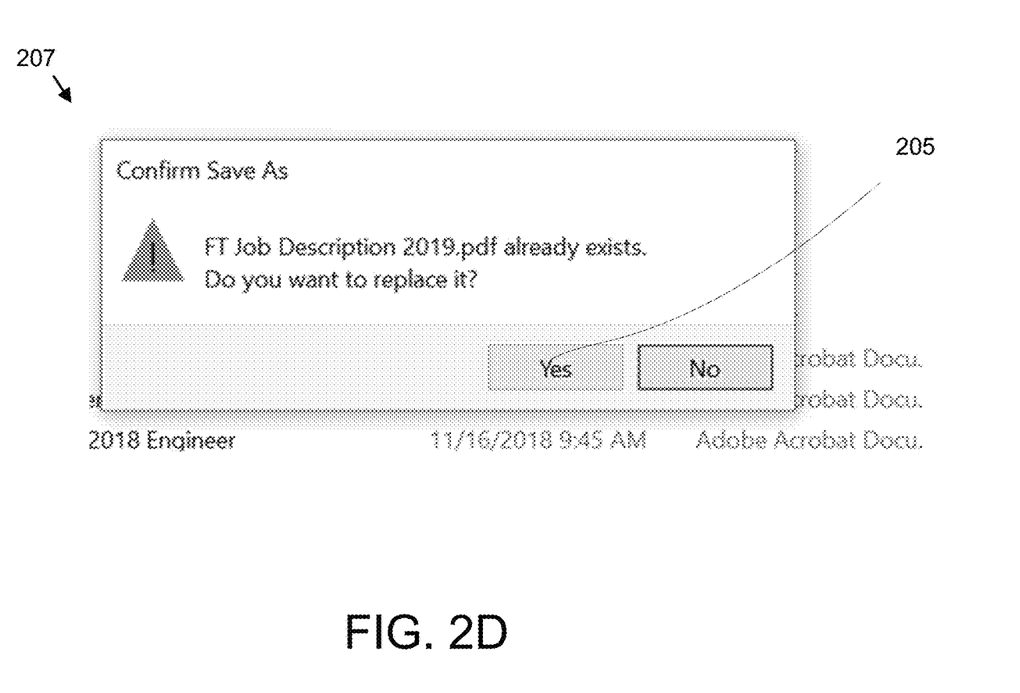
FIG. 2D is an image illustrating one embodiment of a user assent.

FIG. 2D is an image illustrating one embodiment of a user assent 207. In the depicted embodiment, a prompt 205 is presented asking for the user assent 207. The user may select "yes" to generate the user assent 207.

Figure 3A:
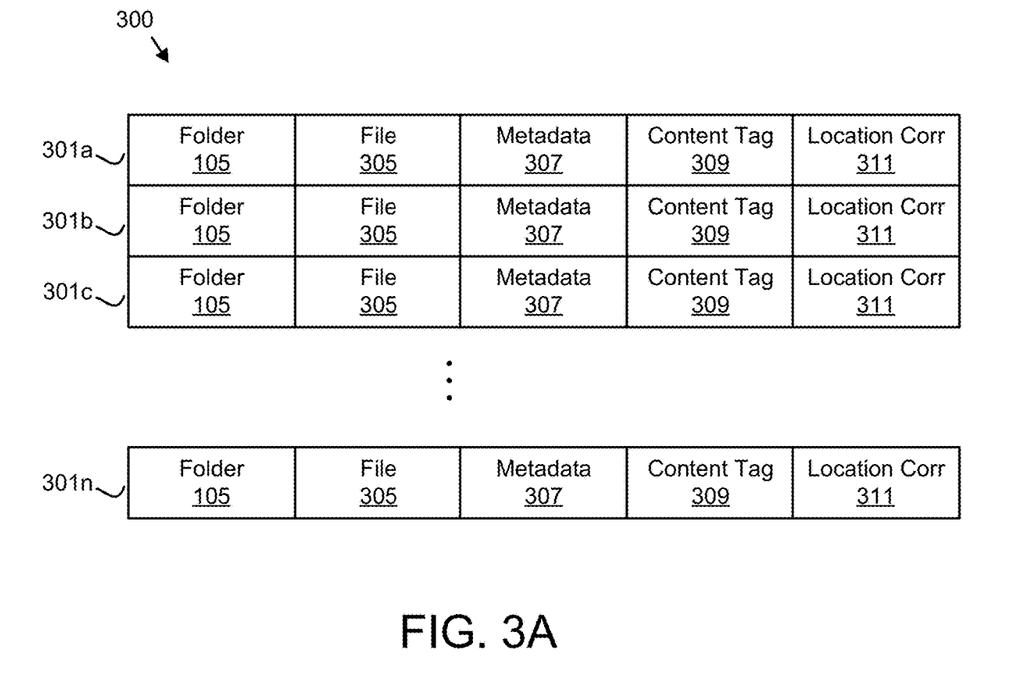
FIG. 3A is a schematic block diagram illustrating one embodiment of a file system database.

FIG. 3A is a schematic block diagram illustrating one embodiment of a file system database 300. The file system database 300 may be used to calculate the location correlation 311. The file system database 300 maybe organized as a data structure in a memory. In the depicted embodiment, the file system database 300 includes a plurality of entries 301. Each entry 301 may represent a file 305 in the file system 100. In one embodiment, each entry 301 identifies a folder 105, a file 305 in the folder 105, metadata 307 for the file 305, one or more content tags 309 for the file 305, and the location correlation 311 that is calculated for the folder 105 and/or file 305.

In one embodiment, the metadata 307 records specific data for the file 305. The metadata 307 may be acquired from each file 305 as the file 305 is added to the folder 105. In addition, the metadata 307 may be modified and/or added to. In one embodiment, the metadata 307 includes an access frequency.

The content tags 309 may identify one or more of categories, labels, and the like associated with content of the file 305. The location correlation 311 may be calculated for a given folder 105 based on a plurality of files 305, calculated for the folder 105 for a single file 305, and/or calculated for specified files 305 associated with the folder 105.

Figure 3B:
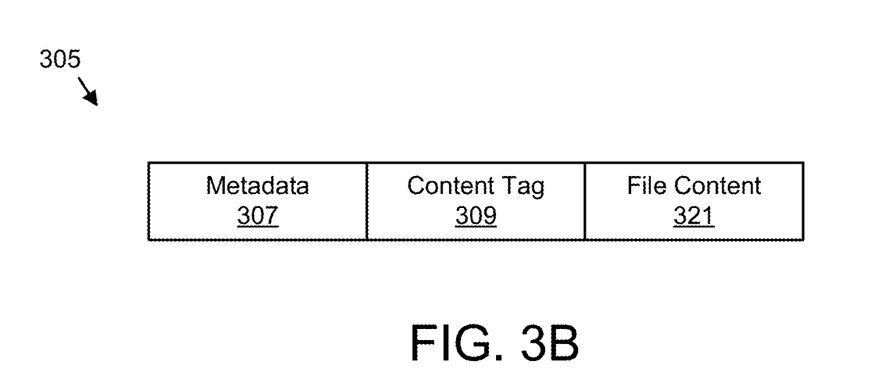
FIG. 3B is a schematic block diagram illustrating one embodiment of a file.

FIG. 3B is a schematic block diagram illustrating one embodiment of a file 305. The file 305 maybe organized as a data structure in a memory. In the depicted embodiment, the file 305 includes metadata 307, a content tag 309, and file content 321. The content tag 309 may be included with the file 305, with the entry 301, or combinations thereof. The file content 321 may include one or more of text, script, images, audio, video, and the like.

Figure 3C:
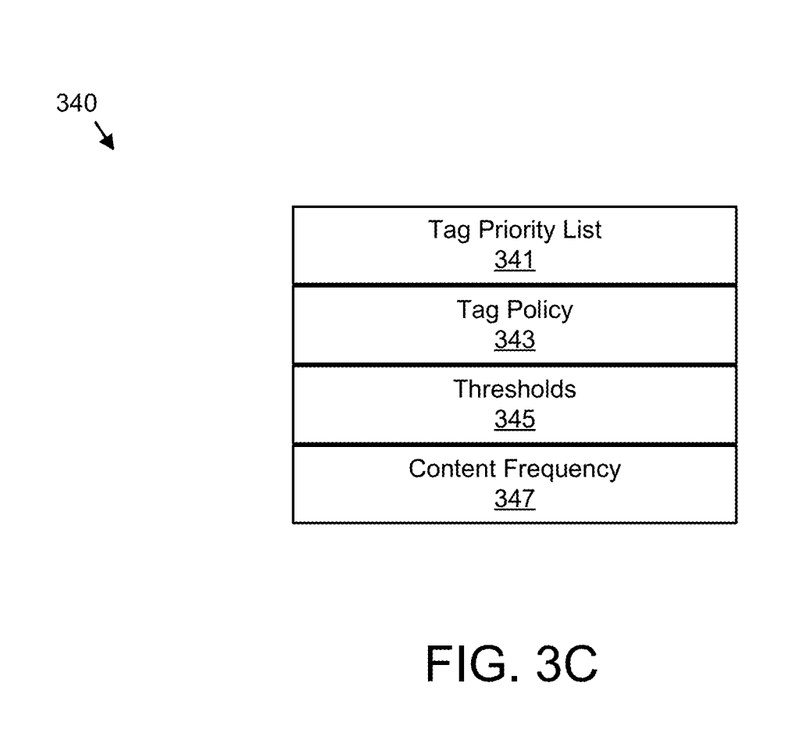
FIG. 3C is a schematic block diagram illustrating one embodiment of system data.

FIG. 3C is a schematic block diagram illustrating one embodiment of system data 340. The system data 340 maybe organized as a data structure in a memory. The system data 340 may be used to calculate the location correlation 311 of folders 105 to a new file 305 and move the new file 305 to a selected folder 105. In the depicted embodiment, the system data 340 includes a tag priority list 341, a tag policy 343, thresholds 345, and a content frequency 347.

The tag priority list 341 may include a plurality of phrases and/or other content. The phrases may be ranked in a priority order. In addition, the phrases may be assigned a weight. In one embodiment, the tag priority list 341 may be consulted to determine which file content 321 should be assigned as content tags 309. In one embodiment, the tag policy 343 assigns the content tags 309 based on the tag priority list 341.

The tag policy 343 may assign content tags 309 to a file 305 and/or folder 105. The tag policy 343 may assign the content tags 309 based on the tag priority list 341. In one embodiment, the tag policy 343 may assign phrases in the tag priority list 341 with a rank above a rank threshold of the thresholds 345 as content tags 309. In addition, the tag policy 343 may assign phrases in the tag priority list 341 with the weight above a weight threshold of the thresholds 345 as content tags 309.

The content frequency 347 may record a frequency of phrases or other content in the file content 321 of files 305. The tag policy 343 may assign the content tags 309 based on the content frequency 347. In one embodiment, the tag policy 343 assigns phrases in the file content 321 that appear in the content frequency 347 with a frequency above a frequency threshold of the thresholds 345 as content tags 309.

Figure 4:
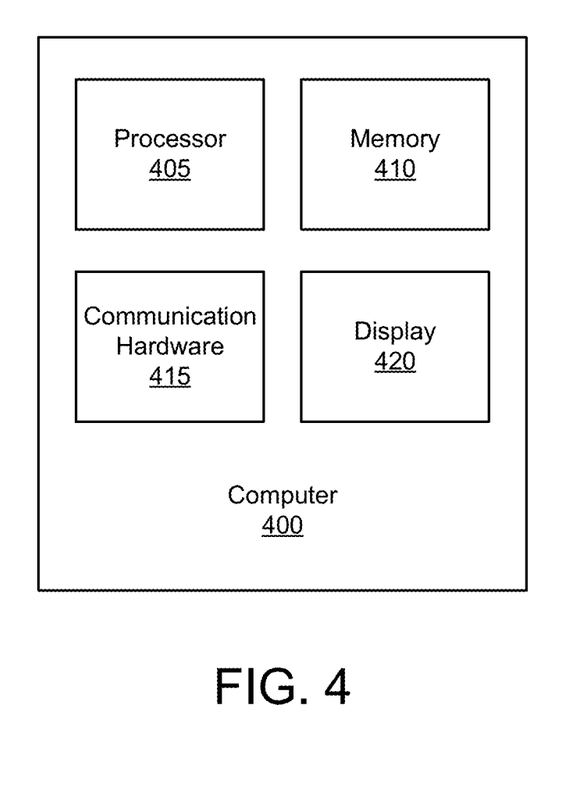
FIG. 4 is a schematic block diagram illustrating one embodiment of a computer.

FIG. 4 is a schematic block diagram illustrating one embodiment of a computer 400. The computer 400 may store the file system 100 in a memory 410. In the depicted embodiment, the computer 400 includes a processor 405, the memory 410, communication hardware 415, and a display 420. The memory 410 may include a semiconductor storage device, a hard disk drive, an optical storage device, a micromechanical storage device, or combinations thereof. The memory 410 may store code. The processor 405 may execute the code. The communication hardware 415 may communicate with other devices. For example, the communication hardware 415 may receive a file 305. The display 420 may present the ranked display 201 and other communications to the user.

Figure 5A:
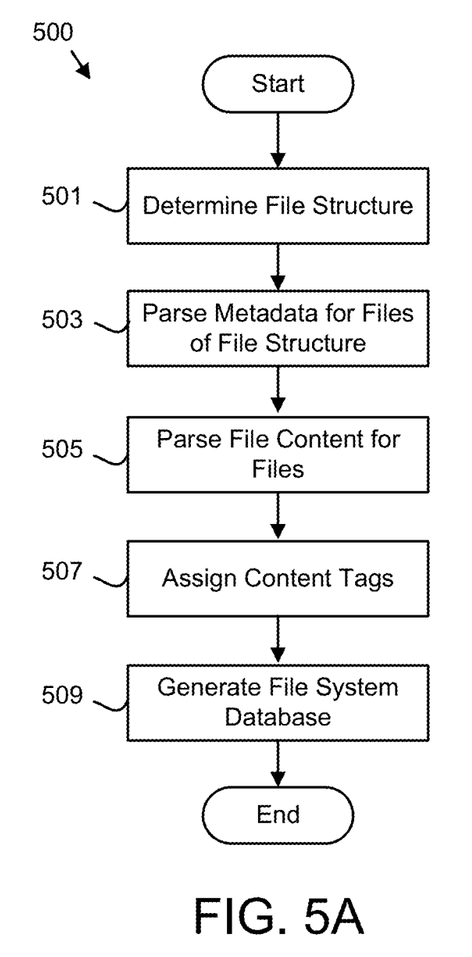
FIG. 5A is a schematic flow chart diagram illustrating one embodiment of a file system database generation method.

FIG. 5A is a schematic flow chart diagram illustrating one embodiment of a file system database generation method 500. The method 500 may generate the file system database 300. The method 500 may be performed by the processor 405.

The method 500 starts, and in one embodiment, the processor 405 determines 501 a file structure for the file system 100. The file structure may specify dependencies between folders 105 as illustrated in FIG. 1.

The processor 405 may parse 503 metadata 307 for existing files 305 of the file system 100. In one embodiment, the processor 405 copies metadata 307 for a file to the file system database 300. The processor 405 may further modify the copied metadata 307.

The processor 405 may parse 505 the file content 321 from the existing files 305 of the file system 100. In one embodiment, the processor 405 identifies a plurality of phrases or other content from the file content 321. In addition, the processor 405 may generate a histogram of the phrases or other content.

The processor 405 may assign 507 content tags 309 to each existing file 305 based on the file content 321 of the existing files 305. In addition, the processor 405 may assign 507 the content tags 309 to each existing file 305 based on both the file content 321 and the metadata 307 of the existing files 305. In a certain embodiment, the content tags 309 are assigned 507 to each existing file 305 based only on the metadata 307 of the existing files 305.

In one embodiment, the processor 405 compares the phrases from the file content 321 to the tag priority list 341.

Each phrase that is included on the tag priority list 341 may be assigned 507 as a content tag 309. In a certain embodiment, each phrase that is included on the tag priority list 341 at a rank that exceeds the rank threshold is assigned 507 as a content tag 309.

In an alternative embodiment, a specified number of phrases that are included on the tag priority list 341 at the highest ranks are assigned 507 as content tags 309. For example, the specified number of phrases maybe five, and the five phrases from the file content 321 that are included on the tag priority list 341 at the highest ranks are assigned 507 as content tags 309.

In one embodiment, each phrase from the file content 321 that is also recorded in the content frequency 347 is assigned 507 as a content tag 309. In a certain embodiment, each phrase that is recorded in the content frequency 347 with a frequency above the frequency threshold is assigned 507 as a content tag 309. In addition, a specified number of phrases that are recorded in the content frequency 347 with the highest frequencies may be assigned 507 as content tags 309.

The processor 405 may generate 509 the file system database 300 based on the metadata 307 and/or the file content 321 for the existing files 305 and the method 500 ends. In one embodiment, the processor 405 records one or more of the file 305, the associated folder 105, the metadata 307, and the content tags 309 in an entry 301 for the file 305.

Figure 5B:
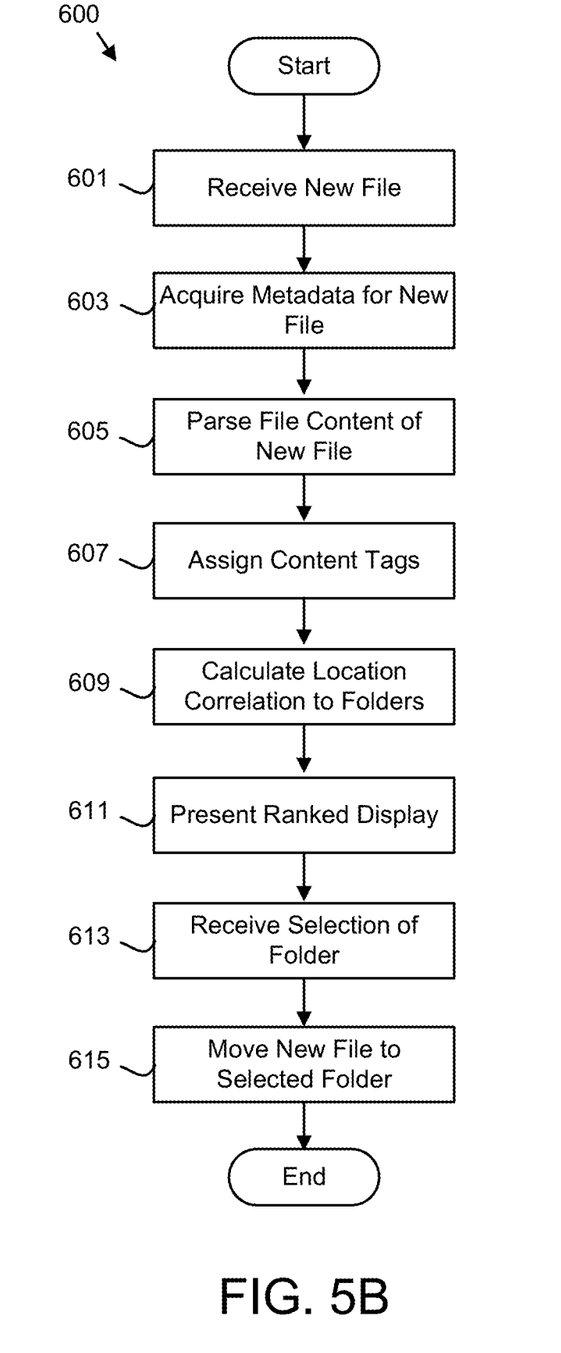
FIG. 5B is a schematic flow chart diagram illustrating one embodiment of a folder selection method.

FIG. 5B is a schematic flow chart diagram illustrating one embodiment of a folder selection method 600. The method 600 may present the ranked display 201 based on the location correlation 311 for a new file 305 and move the new file 305 to a selected folder 105. The method 600 may be performed by the processor 405.

The method 600 starts, and in one embodiment, the processor 405 receives 601 a new file 305. The new file 305 may be downloaded from a message such as an email message 303, downloaded from the Internet, generated by an application, or the like.

The processor 405 may acquire 603 metadata 307 for the new file 305. In one embodiment, the processor 405 reads the metadata 307 from the new file 305. In addition, the processor 405 may write portions of the metadata 307 to an entry 301 for the new file 305 in the file system database 300.

The processor 405 may parse 605 file contents 321 from the new file 305. In one embodiment, the processor 405 reads the file contents 321 and parses phrases and/or other content. In addition, the processor 405 may identify a plurality of phrases or other content from the file content 321. The processor 405 may further generate a histogram of the phrases or other content based on frequency.

The processor 405 may assign 607 content tags 309 for the new file 305 based on the file content 321 and/or the metadata 307. The processor 405 may assign 607 content tags 309 to each existing file 305 based on only the file content 321 of the existing files 305. In addition, the processor 405 may assign 507 the content tags 309 to each existing file 305 based on both the file content 321 and the metadata 307 of the existing files 305. In a certain embodiment, the content tags 309 are assigned 507 to each existing file 305 based only on the metadata 307 of the existing files 305.

The content tags 309 for the new file 305 may be assigned 607 based on the tag policy 343. In one embodiment, the processor 405 assigns 607 the content tags 309 by comparing the phrases from the file content 321 to the tag priority list 341. Each phrase that is included on the tag priority list 341 may be assigned 507 as a content tag 309. In a certain embodiment, each phrase from the file content 321 that is included on the tag priority list 341 at a rank that exceeds the rank threshold is assigned 507 as a content tag 309 for the new file 305. In an alternative embodiment, a specified number of phrases that are included on the tag priority list 341 at the highest ranks are assigned 607 as content tags 309 for the new file 305.

In one embodiment, each phrase from the file content 321 that is also recorded in the content frequency 347 is assigned 607 as a content tag 309. In a certain embodiment, each phrase that is recorded in the content frequency 347 with a frequency above the frequency threshold is assigned 607 as a content tag 309 for the new file 305. In addition, a specified number of phrases that are recorded in the content frequency 347 with the highest frequencies may be assigned 607 as content tags 309 for the new file 305.

The processor 405 may calculate 609 a location correlation 311 to one or more folders 105 of the file system 100 using the file system database 300. In one embodiment, the location correlation 311 is calculated 609 for each folder 105 of the file system 100. In a certain embodiment, the location correlation 311 is calculated 609 for selected folders 305 of the file system 100. The selected folders 305 may store user created content.

The location correlation 311 may be calculated 609 as a function of one or more of a title of the metadata 307, a hash of the metadata 307, and the content tags 309. In one embodiment, a distance score is calculated as an edit distance between the title of the new file 305 and each title in metadata 307 in the file system database 300. In addition, the distance score may be calculated as an edit distance between a hash of the metadata 307 of the new file 305 and a hash of the metadata 307 for each entry 301 in the file system database 300. The hash may be a numerical process that generates a unique version of the metadata 307. The location correlation 311 may be equal to the distance score.

In one embodiment, the location correlation 311 is calculated 609 using Equation 1, wherein TS is a tag score, ST is equal to one if the content tag 309 of an entry 301 is equivalent to a content tag 309 of the new file 305 and otherwise equal to zero, for all content tags 309 of the new file 305, and k is a nonzero constant. The location correlation 311 may be equal to the tag score.

$$TS = k\Sigma ST \qquad \text{Equation 1}$$

In one embodiment, the location correlation LC 311 is calculated using Equation 2, wherein DS is the distance score.

$$LC = DS + TS \qquad \text{Equation 2}$$

In one embodiment, the location correlation 311 for a folder 105 is equal to the highest location correlation 311 of any file 305 in the folder 105. Alternatively, the location correlation 311 for the folder 105 may be the average of location correlations 311 for all files 305 in the folder 105.

The processor 405 may present 611 the ranked display 201 of the folders 105 based on the location correlation 311. The ranked display 201 may be presented 611 on the display 420. The ranked display 201 may present folders 105 and corresponding location correlations 311. In one embodiment, the folders 105 are ranked from highest location correlation 311 as shown in FIG. 2C. In a certain embodiment, only a presentation number of folders 105 are presented 611. The presentation number may be in the range of 3 to 10 and may be stored in the thresholds 345.

The processor 405 may receive 613 a selection of a folder 105 from the ranked display 201. In response to receiving 613 the selection of the folder 105, the processor 405 may move 615 the new file 305 to the selected folder 105 and the method 600 ends.

Figure 5C:
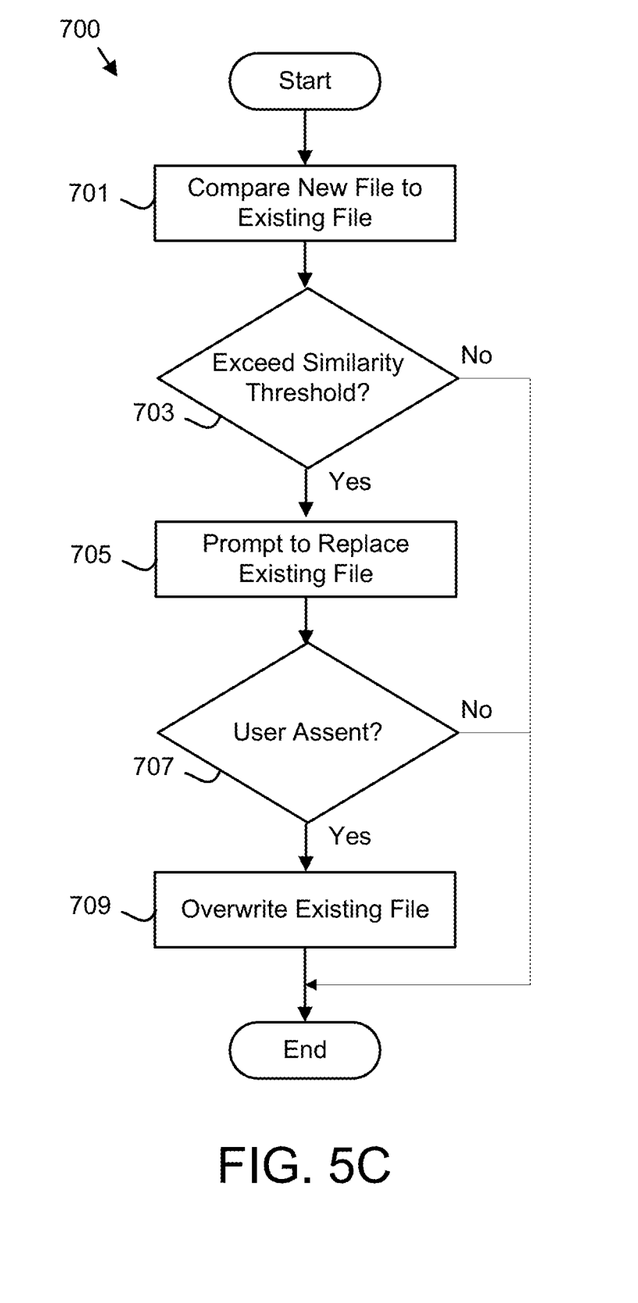
FIG. 5C is a schematic flow chart diagram illustrating one embodiment of a file overwrite method.

FIG. 5C is a schematic flow chart diagram illustrating one embodiment of a file overwrite method 700. The method 700 may overwrite an existing file 305 with the new file 305. The method 700 may be performed by the processor 405.

The method 700 starts, and in one embodiment, the processor 405 compares 701 the new file 305 to an existing file 305. The existing file 305 may be in the selected folder 105 selected in step 613 of FIG. 5B. Alternatively, the processor 405 may compare 701 to each existing file 305 in the file system 100. In a certain embodiment, the processor 405 compares 701 the new file 305 to existing files 305 in selected folders 105. The selected folders 105 may include user created files 305.

The processor 405 may determine 703 if the similarity between the new file 305 and the existing file 305 exceeds a similarity threshold. The similarity may exceed the similarity threshold if the new file 305 and the existing file 305 have the same title. The similarity may be calculated as a distance score between a title of the new file 305 and a title the existing file 305. The similarity threshold may be included in the thresholds 345. If the similarity between the new file 305 and the existing file 305 does not exceed the similarity threshold the method 700 ends.

If the similarity between the new file 305 and the existing file 305 exceeds the similarity threshold, the processor 405 prompts 705 the user to replace the existing file 305 with the new file 305. The processor 405 may present a prompt 205 as shown in FIG. 2D.

The processor 405 may determine 707 whether there is user assent 207 to overwriting the existing file 305 with the new file 305. If user assent 207 is not determined 707, the method 700 ends. If the processor 405 determines 707 there is user assent 207, the processor 405 overwrite 709 the existing file 305 with the new file 305 and the method 700 ends. The method 700 may automatically overwrite 709 the existing file 305 with the new file 305 if the similarity for the existing file 305 and the new file 305 exceeds the similarity threshold. In addition, the method 700 may automatically overwrite 709 the existing file 305 with the new file 305 in response to the user assent 205.

The embodiments calculate the location correlation 311 to each folder 105 of the file system 100 for a new file 305 using the file system database 300. The embodiments further present the ranked display 201 of the folders 105 based on the location correlation 311 and move the new file 305 to a selected folder 305. As a result, a likely destination folder 105 for the new file 305 is determined and selected, increasing the efficiency of identifying destination folders 105 and the improving the efficiency of the computer 400.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a display;
a processor;
a memory that stores code executable by the processor to:
acquire metadata for a new file generated in a save as operation;
parse file content for the new file;
assign content tags for the new file based on the file content and the metadata;
calculate a location correlation to folders of a file system using a file system database, wherein the location correlation is a sum of a distance score and a tag score and the distance score is an edit distance between a hash of the metadata of the new file and a hash of metadata for each entry of the file system;
present a ranked display of the folders based on the location correlation on the display; and
move the new file to a selected folder.

2. The apparatus of claim 1, wherein the code is further executable by the processor to:
assign the content tags based on a tag policy.

3. The apparatus of claim 2, wherein the tag policy assigns the content tags based on a tag priority list.

4. The apparatus of claim 2, wherein the tag policy assigns the content tags based on content frequency.

5. The apparatus of claim 1, wherein the code is further executable by the processor to:
determine a file structure for the file system;
parse metadata for existing files of the file system;
parse file content from the existing files of the file system;
assign content tags to the existing files based on the file content of the existing files; and
generate the file system database based on the metadata and the file content for the existing files.

6. The apparatus of claim 1, wherein the code is further executable by the processor to:
compare the new file to a first existing file in the selected folder;
in response to the first existing file exceeding a similarity threshold, prompt to replace the first existing file with the new file; and
in response to user assent, overwrite the first existing file with the new file.

7. A method comprising:
acquiring, by use of a processor, metadata for a new file generated in a save as operation;
parsing file content for the new file;
assigning content tags for the new file based on file content and the metadata;
calculating a location correlation to folders of a file system using a file system database, wherein the location correlation is a sum of a distance score and a tag score and the distance score is an edit distance between a hash of the metadata of the new file and a hash of metadata for each entry of the file system;
presenting a ranked display of the folders based on the location correlation; and
moving the new file to a selected folder.

8. The method of claim 7, the method further comprising:
assigning the content tags based on a tag policy.

9. The method of claim 8, wherein the tag policy assigns the content tags based on a tag priority list.

10. The method of claim 8, wherein the tag policy assigns the content tags based on content frequency.

11. The method of claim 7, the method further comprising:
   determining a file structure for the file system;
   parsing metadata for existing files of the file system;
   parsing file content from the existing files of the file system;
   assigning content tags to the existing files based on file content of the existing files; and
   generating the file system database based on the metadata and the file content for the existing files.

12. The method of claim 7, the method further comprising:
   comparing the new file to a first existing file in the selected folder;
   in response to the first existing file exceeding a similarity threshold, prompting to replace the first existing file with the new file; and
   in response to user assent, overwriting the first existing file with the new file.

13. A program product comprising a computer readable storage medium that stores code executable by a processor, the executable code comprising code to:
   acquire metadata for a new file generated in a save as operation;
   parse file content for the new file;
   assign content tags for the new file based on the file content and the metadata;
   calculate a location correlation to folders of a file system using a file system database, wherein the location correlation is a sum of a distance score and a tag score and the distance score is an edit distance between a hash of the metadata of the new file and a hash of metadata for each entry of the file system;
   present a ranked display of the folders based on the location correlation; and
   move the new file to a selected folder.

14. The program product of claim 13, wherein the code is further executable by the processor to:
   assign the content tags based on a tag policy.

15. The program product of claim 14, wherein the tag policy assigns the content tags based on a tag priority list.

16. The program product of claim 14, wherein the tag policy assigns the content tags based on content frequency.

17. The program product of claim 13, wherein the code is further executable by the processor to:
   determine a file structure for the file system;
   parse metadata for existing files of the file system;
   parse file content from the existing files of the file system;
   assign content tags to the existing files based on file content of the existing files; and
   generate the file system database based on the metadata and the file content for the existing files.

18. The program product of claim 13, wherein the code is further executable by the processor to:
   compare the new file to a first existing file in the selected folder;
   in response to the first existing file exceeding a similarity threshold, prompt to replace the first existing file with the new file; and
   in response to user assent, overwrite the first existing file with the new file.

\* \* \* \* \*